United States Patent

[11] 3,563,596

[72] Inventor George Gordon Davis
 3500 Greenleaf Blvd., Elkhart, Ind. 46514
[21] Appl. No. 808,864
[22] Filed Mar. 20, 1969
[45] Patented Feb. 16, 1971

[54] CAMPER-HAULER
 2 Claims, 2 Drawing Figs.
[52] U.S. Cl. ................................................ 296/23
[51] Int. Cl. ................................................ B60p 3/32
[50] Field of Search ........................................ 296/23;
 280/414

[56] References Cited
 UNITED STATES PATENTS
 D156,547 12/1949 Madison .................... 296/23X
 2,569,082 9/1951 Wheeler .................... 296/23

*Primary Examiner*—Philip Goodman
*Attorney*—Wolfe, Hubbard, Leydig, Voit & Osann ABSTRACT: A camper-hauler vehicle combining, on one trailer chassis, a body shell containing living facilities and a platform for carrying an auxiliary load like a boat or sport vehicle. The body shell is formed with a ledge portion overlying the platform and containing a sleeping area. Structure on each side of the platform defines wheel fenders and platform side rails.

PATENTED FEB 16 1971　　　　3,563,596
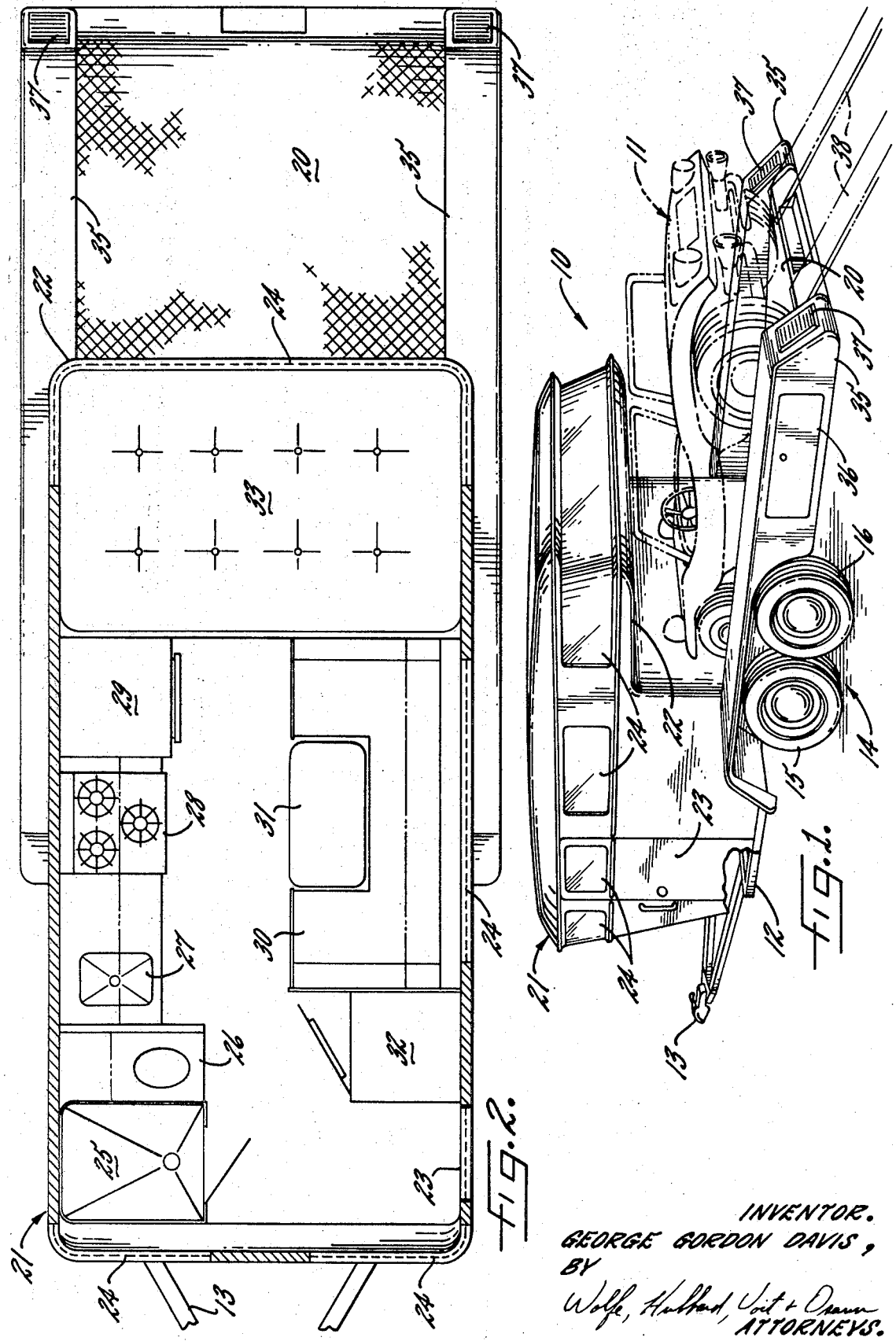
INVENTOR.
GEORGE GORDON DAVIS,
BY
Wolfe, Hubbard, Voit & Osann
ATTORNEYS.

CAMPER-HAULER

DESCRIPTION OF THE INVENTION

This invention relates generally to trailer vehicles and more particularly concerns a camping and hauling vehicle.

Camper vehicles providing compact living quarters which can go right along with vacationers and sportsmen have enjoyed ever-increasing popularity. One drawback often experienced with such vehicles is the difficulty in taking along a small boat, a sport vehicle or other large piece of equipment to be utilized when the traveller reaches his intended designation.

It is therefore the primary aim of the invention to provide a trailer vehicle combining the functions of a camper and a hauler so that, with a single vehicle, living quarters and auxiliary equipment can conveniently accompany the traveller.

An object of the invention is to provide a camper-hauler of the above type in which the camper portion of the vehicle is of a standard configuration so that the vehicle can be readily and economically produced as part of a camper "line."

A further object is to provide a camper-hauler which is relatively compact, well balanced and suited to attractive styling.

Other objects and advantages of the invention will become apparent upon reading the following detailed description and upon reference to the drawing, in which:

FIG. 1 is a rear quarter perspective of a camper-hauler embodying the invention; and FIG. 2 is a horizontal enlarged section presenting the interior of the vehicle shown in FIG. 1.

While the invention will be described in connection with a preferred embodiment, it will be understood that I do not intend to limit the invention to that embodiment. On the contrary, I intend to cover all alternatives, modifications and equivalents as might be included within the spirit and scope of the invention.

Turning to the drawing, there is shown a camper-hauler 10 embodying the invention and carrying a sport vehicle 11 of the type known as a dune buggy. The camper-hauler 10 includes a frame 12 having a conventional towing hitch 13 at one end and a wheel assembly 14 at the midportion of the frame. In the illustrated construction, tandem wheels 15 and 16 are mounted at each side of the frame.

In accordance with the invention, a low load-carrying platform 20 is positioned at the end of the frame 12 opposite to the hitch 13, and a body shell 21 is mounted on the frame 12 between the hitch 13 and the platform 20. The body shell 21 includes a ledge portion 22 extending out over at least a portion of the platform 20, with the ledge portion 22 being spaced well above the platform to provide a load carrying region above the full extent of the platform. As illustrated, the front engine portion of the dune buggy 11 fits easily under the ledge portion 22.

The body shell 21 provides mobile living quarters, and, to that end, includes an access door 23 and windows 24. The shell 21 preferably contains equipment normally associated with such vehicles such as a shower 25, chemical toilet 26, sink 27, cooking range 28, heater 29, table 30, seating couch 31 and refrigerator 32. Fitted within the ledge portion 22 is a bed 33 defining a sleeping area.

As a feature of the invention, a pair of boxlike structures 35 extend along each side of the platform 20 so as to define fenders for the wheel assemblies 14 and side rails for the platform 20. Preferably, the structures 35 also include storage compartments 36 and vehicle tail light assemblies 37.

Loading and unloading the platform 20 is facilitated by employing removable ramp members 38.

Those familiar with this art will recognize that the body shell 21 closely resembles a conventional camper of the type intended to be fitted into the back of an open truck—although the shell is reversed front to rear with respect to such a camper. This standardization of configuration makes the camper-hauler 10 fit economically into a product "line" of a camper manufacturer, and even permits conventional campers to be utilized, with a minimum of modification, as a subassembly for the camper-hauler 10.

While a dune buggy 11 is shown carried on the platform 20, it will be readily apparent that any similar bulky piece of equipment can be similarly carried. A motorcycle, snow-mobile or small boat might well be brought along by the owner of the camper-hauler 10.

It will also be seen that the camper-hauler is relatively compact and, even when loaded, well balanced with respect to the wheel assembly 14. With no substantial load on the platform 20, the center of gravity is positioned between the wheel assembly and the hitch 13 so as to insure stable towing characteristics. Finally, the arrangement of the major components permits the entire unit to be attractively styled.

We claim:

1. A trailer type vehicle comprising a chassis, a hitch at one end of said chassis, a wheel assembly at the midportion of said chassis, a low load supporting platform at the end of said chassis opposite to said hitch, and a body shell mounted on said chassis between said hitch and said platform, said shell having a ledge portion extending out over at least a portion of said platform, said ledge portion being spaced well above said platform to provide a load carrying region above the full extent of said platform, said body shell including an entrance floor and containing equipment for human habitation, said equipment including a bed disposed in said ledge portion.

2. A trailer type vehicle comprising, in combination, a substantially flat chassis, a hitch at one end of said chassis, a wheel assembly at the midportion of said chassis, a low load supporting platform at the end of said chassis opposite to said hitch, and a camper body shell mounted on said chassis between said hitch and said platform, said shell having a main substantially square portion and a boxlike ledge portion opening into the upper part of said main portion so as to form a part of the total internally accessible area of the body shell, said body shell being disposed on said chassis so that said ledge portion extends out over at least a portion of said platform and is spaced well above said platform to provide a load carrying region above the full extent of said platform.